Patented Aug. 23, 1949

2,479,885

UNITED STATES PATENT OFFICE 2,479,885

REACTIVATION OF OVERHEATED SILVER SURFACE CATALYSTS

Theo John West, Port Arthur, Tex., assignor to Allied Chemical & Dye Corporation, a corporation of New York No Drawing. Application June 11, 1946, Serial No. 676,115

14 Claims. (Cl. 252—415)

This invention relates to the reactivation of catalysts, which have lost activity, for use in processes of making olefin oxides by the direct catalytic oxidation of olefins by means of oxygen.

Processes for oxidizing olefins directly to olefin oxides by means of oxygen in the presence of silver surface catalysts are well-known. These catalysts in use may become overheated due to development of hot spots or failure in the temperature control system for maintaining the catalysts at a constant temperature or for other reasons. Such overheating results in a material reduction in the activity of the catalysts.

Among the objects of this invention is to provide a convenient and economical method for reactivating such silver surface catalysts which have become overheated and have thereby suffered a material loss in activity. Another object is to provide a process for reactivating silver surface catalysts which process can be applied to the catalyst while in the catalyst converter, i. e., in the practice of the process of this invention it is not necessary to remove the catalyst from the converter, but the reactivation may be carried out without disturbing the catalyst in the converter.

Silver surface catalysts which have been overheated are reactivated according to the present discovery by a treatment which involves contacting the catalyst first with a halogen or halogen compound followed by treatment with ammonia. The second step of the reactivation may be effected by passing a stream of ammonia gas over the catalyst and may be carried out in the presence or in the absence of oxygen. Conveniently, the source of oxygen, if used, is air containing nitrogen as a natural diluent; the ammonia may be added to the air or other oxygen stream used to effect oxidation of the olefin and passed over the catalyst while the flow of the olefin is interrupted, or the ammonia may be added to the olefin-oxygen stream and the ammonia treatment carried out in the presence of the olefin and the oxidation reaction products. The activity and selectivity of the catalyst are both improved by this reactivation treatment.

The halogens which may be employed in the first step of the reactivation are chlorine, bromine, iodine or fluorine; chlorine is preferred. Moreover the use of vapors of halogen containing substances is preferred to the use of the halogens themselves because the halogens are extremely reactive with silver and when used as such the silver halides formed are not distributed uniformly throughout the catalyst bed. By using a halogen containing organic substance more even distribution of the silver halide throughout the catalyst bed results. Halogen containing organic compounds which may be used are those which under the conditions prevailing in the catalyst converter react with the silver catalyst to form silver halides. Examples of these compounds are ethylene dichloride, methylene chloride, methyl chloride, ethyl chloride, or corresponding compounds of the other halogens, bromine, iodine and fluorine. Of these ethylene dichloride is preferred.

As above indicated, the ammonia may be added to the air stream employed to supply oxygen to support the oxidation of the olefin to olefin oxide and the resultant stream passed over the catalyst in the converter after flow of halogen compound thereover to effect the reactivation of the overheated catalyst. Preferably the halogen or halogen containing compound is added to the stream of olefin and air passing over the catalyst and thereafter the air stream containing ammonia is passed over the catalyst to complete the reactivation, the flow of olefin being interrupted while the ammonia air stream passes over the catalyst. If desired, however, the reactivation treatment may be carried out without interrupting the flow of olefin over the catalyst, i. e., the halogen or halogen containing compound is first incorporated in the olefin air stream passing over the catalyst and then after the completion of this step, ammonia is added to the olefin air stream, the resultant gaseous mixture passed over the catalyst for a period of time sufficient to restore the activity of the catalyst.

The amount of halogen or halogen containing compound passed over the catalyst in the first step of the reactivation treatment and the duration of this step will, of course, depend on the nature of the catalyst, the size of the catalyst bed, etc. In the oxidation of ethylene to ethylene oxide, the preferred quantity of halogen to condition the catalyst for the next step of the reactivation treatment is about $10^{-5}$ mol halogen per gram of silver. The rate of flow of the halogen compound over the catalyst and the time of treatment will, of course, vary, depending upon the nature of the catalyst treated, the size of the catalyst converter, etc. When the halogen compound is added to the reactant gases, its rate of flow will, of course, be the same as that of these gases.

The amount of ammonia added to the gas stream may vary within wide limits; from about 1 to about 6 mol percent is preferred. The ammonia may be incorporated in the air stream by passing the air through an ammonium hydroxide solution prior to passage of the ammonia air stream over the catalyst or by adding anhydrous ammonia in the desired proportions to the air stream. Water vapor may be added to the ammonia-oxygen stream employed in the second step of the reactivation. The larger the concentration of the ammonia in the gas stream employed in this step, the larger the quantity of water vapor which should be added to this gas stream. Preferably, about 6 mols of water vapor are added per mol ammonia in this gas stream. The addition of water vapor to the ammonia oxygen stream, it has been found, results in uniform activation of the catalyst throughout the whole bed. The water vapor moderates the reaction between the ammonia and oxygen on the one hand, and the impurities and silver surface on the other, preventing overheating of the inlet end of the catalyst bed and resulting in more uniform activation of the catalyst throughout the whole length and cross-sectional area of the bed. Furthermore, ammonia itself is oxidized over the catalyst in the presence of oxygen. The presence of water vapor moderates this reaction and causes the ammonia and oxygen to more effectively activate the catalyst. The use of water vapor is particularly desirable when activating relatively long catalyst beds maintained in tubes of relatively large diameter in which heat transfer from the catalyst to the temperature control medium is not readily accomplished.

Both steps of the reactivation treatment are preferably carried out under the pressure conditions prevailing in the converter. The temperatures used are preferably those prevailing in the converter during the passage of the olefin-air mixture therethrough, because the reactivation treatment is best carried out at elevated temperatures. In the treatment of overheated silver surface catalysts used in the oxidation of ethylene to ethylene oxide, the process of reactivation may be carried out at an elevated temperature below 325° C., for example at a temperature of from 170° to 325° C., preferably from 260° to 280° C.

The amount of oxygen, if used, containing ammonia and the time of treatment will vary depending upon the nature of the catalyst treated, the degree of overheating, the size of the catalyst converter, etc. In general, treatment should be continued with a sufficient volume of ammonia or oxygen and ammonia until the activity of the catalyst has been restored. This can readily be determined by testing a sample of the catalyst which has been reactivated to determine its activity. The reactivation may be conveniently carried out by simply adding the halogen compound to the olefin oxygen nitrogen stream passed over the catalyst, and then adding the ammonia to the oxygen nitrogen stream with or without interrupting the flow of the olefin and without removing the body of catalyst from the converter.

Reactivation, according to this invention, may be applied to all forms of silver surface catalysts used for catalyzing the oxidation of olefins to olefin oxides, particularly ethylene to ethylene oxide. Silver surface catalysts which are desirably maintained on catalyst supports such as silica, fused alumina refractory materials, and zirconium oxide, including, but without limitation, Tabular Corundum, Alusite, and Alundum, crushed and screened to a convenient size, may be reactivated by the process of the invention. The reactivation procedure may be applied to silver surface catalysts which have been promoted, for example, by the incorporation therein of the oxides, hydroxides or peroxides of barium, lithium or strontium, or by the addition of promotive metals such as gold or copper. It may be applied to the activation of overheated silver surface catalysts produced by co-precipitating silver oxide and silver halides such as silver chloride, bromide, iodide or fluoride, the latter constituent acting as a promoter, and reducing the co-precipitated silver compounds with ammonia at an elevated temperature, the subject of copending application, Serial No. 676,116 filed June 11, 1946, now U. S. Patent No. 2,463,228, issued March 1, 1949. Such co-precipitated silver surface catalysts should contain from .03 to .3 percent silver halide by weight of silver oxide, when the silver compounds are co-precipitated, for optimum results.

In this example, the catalyst was prepared by mixing 8 parts of 8–10 mesh Alundum with one part by weight of ground silver oxide, adding sufficient water to form a thick slurry with the silver oxide and stirring the mixture until the Alundum was well coated with the silver oxide. The wet catalyst was then dried in an oven at about 85° C. It was placed in a jacketed converter surrounded by boiling heat transfer medium consisting of a mixture of diphenyl and diphenyl oxide.

A mixture of oxygen, ethylene oxide and nitrogen containing 20 volume percent oxygen from 2.4 to 2.5 volume percent ethylene and the rest nitrogen was passed over the catalyst at a space velocity of 870. Periodically during the course of the example the reaction products were sampled and the samples analyzed to determine their ethylene, ethylene oxide and carbon dioxide content and from these values the percent attack, percent efficiency and percent conversion determined.

By "space velocity" as used herein, is meant the volumes of total gas (at standard conditions of 0.° C. and 760 mm. of mercury pressure) passed over the body of catalyst per hour per volume of catalyst body. By "percent attack" is meant the mols of ethylene converted to carbon dioxide and ethylene oxide ×100, divided by the mols of ethylene passed over the catalyst. By "percent conversion" is meant percent ethylene converted to ethylene oxide per pass through the converter. By "percent efficiency" is meant the number of mols of ethylene converted to ethylene oxide×100, divided by the number of mols of ethylene converted to ethylene oxide and carbon dioxide.

In the following table the values under the designation "time hours" indicate the time after the commencement of the first run at which the reaction products were sampled and analyzed.

*Table I*

| Run | Average Catalyst T., °C. | Time, Hours | Percent Attack | Percent Efficiency | Percent Conversion |
|---|---|---|---|---|---|
| 1 | 260 | 25 | 59.1 | 34.2 | 20.4 |
| 2 | 259 | 96 | 40.9 | 43 | 17.6 |
| 3 | 393 | 169 | 21.3 | 7.3 | 1.6 |
| 4 | 259 | 170 | 6.8 | 21 | 2.8 |
| 5 | 259 | 181 | 11.7 | 48.9 | 5.7 |
| 6 | 259 | 218 | 34.6 | 59 | 20.4 |
| 7 | 259 | 244 | 41.7 | 56 | 23.3 |
| 8 | 261 | 313 | 46.8 | 50.8 | 23.8 |
| 9 | 261 | 365 | 47.4 | 61.6 | 29.2 |
| 10 | 261 | 413 | 62.9 | 57.4 | 36.1 |
| 11 | 259 | 485 | 65.4 | 56.3 | 36.8 |

Between runs 2 and 3 the aforesaid heat transfer medium consisting of a mixture of diphenyl and diphenyl oxide leaked out of the converter jacket. It will be noted from run 3 that the average temperature of the catalyst rose to 393° C. The reaction products were sampled and analyzed during this period and from run 3 it will be be noted an attack of 21.3% and efficiency of 7.3% was obtained as compared with 40.9% attack and 43% efficiency obtained just before the overheating took place. The aforesaid heat transfer medium was then charged to the jacket and run 4 made with the same catalyst at an average temperature of 259° C.; the catalyst was found to give a percent attack of 6.8, an efficiency of 21.

Between runs 4 and 5 the reactivation treatment of the invention was applied by passing .05 mol percent ethylene dichloride for 5 minutes into the ethylene, oxygen and nitrogen stream passing over the catalyst and thereafter passing over the catalyst a stream of oxygen and nitrogen containing 6 mol percent ammonia and 6 mol percent water vapor for a 5 hour period, the oxygen, nitrogen stream employed being that previously used to support oxidation of the ethylene. The ethylene flow was interrupted during the passage of the ammonia oxygen stream over the catalyst and resumed immediately after cessation of the introduction of ammonia into the gas stream. Ammonia was introduced into the oxygen nitrogen stream by passing the latter through a 3 normal solution of ammonium hydroxide maintained at a temperature of 30° C. and passing the resultant stream containing 6 mol percent ammonia and 6 mol percent water vapor through the body of catalyst in the converter.

It will be noted from runs 5, 6, 7 and 8 that as the operation continued, the percent attack, percent efficiency and percent conversion gradually rose, indicating that the reactivity of the catalyst had been partially restored by the reactivation treatment. Between runs 8 and 9 the reactivation treatment hereinabove described was repeated, the flow of oxygen nitrogen containing 6 mol percent ammonia and 6 mol percent water vapor being continued for one hour. From runs 9, 10 and 11 it will be noted that the reactivation treatment completely restored the activity of the catalyst. In fact the catalyst during runs 10 and 11 had an improved activity and selectivity as compared with the activity and selectivity of the catalyst before it had become impaired due to overheating.

The expression "oxidation of olefins to olefin oxides" is used in the specification and claims to include the oxidation of a single olefin, e. g., ethylene to ethylene oxide, as well as the oxidation of a mixture of olefins.

Since certain changes may be made in carrying out the above process without departing from the scope of the invention, it is intended that all matter contained in the above description shall be interpreted as illustrative and not in a limiting sense.

What is claimed is:

1. The method of revivifying an overheated silver surface catalyst employed in the oxidation of ethylene to ethylene oxide in a catalyst converter containing a body of said catalyst, which method comprises flowing ethylene dichloride over said body of overheated catalyst in said converter at a temperature of from 170° to 325° C. and thereafter flowing a stream of ammonia and water vapor over the said body of catalyst at a temperature of from 170° to 325° C.

2. The method of revivifying an overheated silver surface catalyst employed in the oxidation of ethylene to ethylene oxide in a catalyst converter containing a body of said catalyst, which method comprises flowing ethylene dichloride over said body of overheated catalyst in said converter at a temperature of from 260° to 280° C. and thereafter flowing a stream of air, ammonia and water vapor containing about 6 mols of water vapor per mol of ammonia over the said body of catalyst at a temperature of from 260° to 280° C.

3. The process of reactivating a silver surface catalyst which has been overheated with consequent reduction in its activity, which comprises first passing a halogen over said overheated catalyst at a temperature of from 170° to 325° C., and thereafter passing ammonia over the said catalyst at a temperature of from 170° to 325° C.

4. The method of reactivating an overheated silver surface catalyst as defined in claim 3, in which the temperature of the catalyst is within the range of from 260° to 280° C. during the passage of the halogen thereover and also during the passage of the ammonia thereover.

5. The process of reactivating a silver surface catalyst which has been overheated with consequent reduction in its activity, which comprises first passing a halogen over said overheated catalyst at a temperature of from 170° to 325° C., and thereafter passing oxygen and ammonia over the said catalyst at a temperature of from 170° to 325° C.

6. The process of reactivating a silver surface catalyst which has been overheated with consequent reduction in its activity, which comprises first passing a halogen over said overheated catalyst at a temperature of from 170° to 325° C., and thereafter passing ammonia and water vapor over said catalyst at a temperature of from 170° to 325° C.

7. The process of reactivating an overheated silver surface catalyst as defined in claim 6, in which the stream of ammonia and water vapor contains about 6 mols of water vapor per mol of ammonia.

8. The method of revivifying an overheated silver surface catalyst employed to catalyze the oxidation of olefins to olefin oxides, which comprises first passing a halogen over the catalyst at a temperature of from 170° to 325° C., and thereafter passing oxygen, ammonia and water vapor over said catalyst at a temperature of from 170° to 325° C.

9. The method of revivifying an overheated silver surface catalyst as defined in claim 8, in which the temperature of the catalyst is within the range of from 260° to 280° C. during the passage of the halogen thereover and also during the passage of the oxygen, ammonia and water vapor thereover.

10. The method of revivifying an overheated silver surface catalyst employed to catalyze the oxidation of olefins to olefin oxides in a catalyst converter containing a body of said catalyst, which method comprises flowing a member of the group consisting of halogens, alkyl halides and alkylene halides through said body of catalyst in said catalyst converter at a temperature of from 170° to 325° C., and thereafter flowing a stream of ammonia and water vapor over said body of catalyst in said catalyst converter at a temperature of from 170° to 325° C.

11. The method of revivifying an overheated silver surface catalyst as defined in claim 10, in which the catalyst is at a temperature of from 260° to 280° C. during the passage of the said member thereover and also during the passage of the stream of ammonia and water vapor thereover and the stream of ammonia and water vapor contains about 6 mols of water vapor per mol of ammonia.

12. The method of revivifying an overheated silver surface catalyst employed to catalyze the oxidation of olefins to olefin oxides, which comprises first passing ethylene dichloride over the catalyst at a temperature of from 170° to 325° C., and thereafter passing ammonia, oxygen and water vapor over said catalyst at a temperature of from 170° to 325° C.

13. A process of reactivating a silver surface catalyst which has been overheated with consequent reduction in its activity, which comprises, first passing a member of the group consisting of halogens, alkyl halides and alkylene halides over said overheated catalyst at a temperature of from 170° to 325° C. and thereafter passing ammonia over the said catalyst at a temperature of from 170° to 325° C.

14. The method of reactivating an overheated silver surface catalyst as defined in claim 13, in which the temperature of the catalyst is within the range of from 260° to 280° C. during the passage of the said member thereover and also during the passage of the ammonia thereover.

THEO JOHN WEST.

REFERENCES CITED

The following references are of record in the file of this patent:

UNITED STATES PATENTS

| Number | Name | Date |
|---|---|---|
| 1,848,723 | Jaeger | Mar. 8, 1932 |
| 2,194,602 | Law | Mar. 26, 1940 |

FOREIGN PATENTS

| Number | Country | Date |
|---|---|---|
| 397,161 | Great Britain | Aug. 3, 1933 |